United States Patent
Rethaber

(10) Patent No.: US 10,470,362 B2
(45) Date of Patent: Nov. 12, 2019

(54) DEVICE FOR FASTENING A TOOL MEMBER ON A DRIVE SHAFT OF A MOTORICALLY DRIVEN POWER TOOL

(71) Applicant: Andreas Stihl AG & Co. KG, Waiblingen (DE)

(72) Inventor: Achim Rethaber, Fellbach (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 57 days.

(21) Appl. No.: 15/665,832

(22) Filed: Aug. 1, 2017

(65) Prior Publication Data
US 2018/0035608 A1    Feb. 8, 2018

(30) Foreign Application Priority Data
Aug. 4, 2016  (EP) ..................................... 16001730

(51) Int. Cl.
A01D 34/47        (2006.01)
A01D 34/62        (2006.01)
A01D 34/90        (2006.01)
A01D 34/73        (2006.01)

(52) U.S. Cl.
CPC ............. *A01D 34/47* (2013.01); *A01D 34/62* (2013.01); *A01D 34/733* (2013.01); *A01D 34/90* (2013.01)

(58) Field of Classification Search
CPC ...... A01D 34/47; A01D 34/62; A01D 34/733; A01D 34/90
See application file for complete search history.

(56) References Cited

U.S. PATENT DOCUMENTS

| | | | | |
|---|---|---|---|---|
| 3,415,043 A * | 12/1968 | Shones | ................... | A01D 34/82 56/13.6 |
| 4,316,355 A * | 2/1982 | Hoff | .................... | A01D 34/6812 56/11.3 |
| 6,032,369 A | 3/2000 | Tada et al. | | |
| 6,065,214 A * | 5/2000 | Nagashima | ........ | A01D 34/6812 30/276 |
| 9,883,628 B2 * | 2/2018 | Morabit | ............. | A01D 34/4165 |
| 2007/0006562 A1 | 1/2007 | Davis et al. | | |

FOREIGN PATENT DOCUMENTS

EP    2 311 306      4/2011
JP    H11 196649     7/1999
WO    2012/095029    7/2012

* cited by examiner

*Primary Examiner* — Omar Flores Sanchez
(74) *Attorney, Agent, or Firm* — Gudrun E. Huckett

(57) ABSTRACT

A device for fastening a tool member on an output shaft of a power tool has a support plate supporting the tool member and a clamping element embodied as a connecting hub. The connecting hub is penetrated by the output shaft and is rotationally fixed on the output shaft. A rider plate is secured on the connecting hub and rotatable relative to the connecting hub. Support plate, tool member, rider plate, and connecting hub are arranged such that the output shaft projects through support plate, tool member, rider plate, and connecting hub. A clamping device is carried on an end of the output shaft. The clamping device acts on a support surface of the connecting hub and fixes through the connecting hub the tool member on the support plate. Connecting hub, rider plate, and pressure plate together form preferably a conjoint, connected component assembly.

17 Claims, 9 Drawing Sheets

DEVICE FOR FASTENING A TOOL MEMBER ON A DRIVE SHAFT OF A MOTORICALLY DRIVEN POWER TOOL

BACKGROUND OF THE INVENTION

The invention relates to a device for fastening a tool member on a drive shaft of a motorically driven power tool, comprising a support plate for the tool member, wherein the drive shaft projects through the support plate, the tool member, a rider plate, and a clamping element. The drive shaft supports a clamping device that, by means of the clamping element, fixes the tool member on the support plate.

A device for fastening a tool member on a tool head is disclosed in U.S. Pat. No. 6,032,369. The support plate comprises a hub that projects through a central opening of the tool member. The support plate and the tool member are penetrated by the output shaft of a gearbox wherein a pressure plate, a rider plate, and a clamping device are arranged on the output shaft. The clamping device is designed as a clamping nut that is screwed onto a threaded section of the end of the output shaft. The clamping nut acts on a fastening rim of the rider plate which is supported on the pressure plate. The pressure plate is contacting the tool member that is arranged on the support plate.

When tightening the clamping nut, the clamping force is transmitted by the fastening rim of the rider plate onto the pressure plate wherein the fastening rim is secured by being clamping between the clamping nut and the pressure plate. When the rider plate touches the ground during working with the tool head, a braking moment is acting on the rider plate. Since the clamping nut is immediately contacting the fastening rim of the rider plate, torque is acting on the clamping nut and can cause loosening of the clamping nut on the thread of the output shaft. The torque can also cause an excessively strong tightening of the clamping device which makes it difficult to release the arrangement and/or can cause overload of the arrangement.

In order to counteract this loosening of the clamping nut or an overload of the arrangement, it can be provided in case of clockwise rotating drive shafts to provide a left-hand thread and in case of counterclockwise rotating drive shafts to provide a right-hand thread. In particular in case of power tools that are driven in different rotational directions during operation, it is thus only possible to provide a securing action in one rotational direction.

The invention has the object to provide a device for fastening a tool member on a rotating output shaft that, independent of the rotational direction of the output shaft, prevents loosening of the clamping device when the rider plate comes into contact with the ground.

SUMMARY OF THE INVENTION

In accordance with the invention, the object is solved with the combination of the following features: The clamping element is configured as a connecting hub. The rider plate is secured on the connecting hub. The rider plate is rotatable relative to the connecting hub. The connecting hub is penetrated by the output shaft. The connecting hub is rotationally fixed on (secured to rotate together with) the output shaft and the clamping device acts on a support surface of the connecting hub.

The clamping device that is mounted on the output shaft, preferably a clamping nut or a clamping screw, exerts by means of the clamping element a clamping force on the tool member. According to the invention, the clamping element is embodied as a connecting hub. The rider plate is secured on the connecting hub, wherein it is provided that the rider plate is rotatable relative to the connecting hub without providing a clamping force and/or, in final mounted position, i.e., after overcoming a friction force, is rotatable relative to the connecting hub. In the final mounted position, by tightening the clamping device, a clamping force is applied on the tool member that fixes the tool member.

The connecting hub is penetrated by the output shaft and is configured such that the connecting hub is rotationally fixed on the output shaft. In this context, it is provided that the clamping device, preferably a clamping nut, acts to apply a clamping force on a support surface of the connecting hub.

In a further embodiment of the invention, the connecting hub acts on a pressure plate which is configured to contact the tool member. Like the support plate, the connecting hub, and the rider plate, the pressure plate is also penetrated by the drive shaft. The shape and dimensions of the support plate can be selected as is expedient; in particular, the radial expansion of the support plate is greater, in particular multiple times greater, than in its expansion in axial direction. The support plate is in particular round, wherein the diameter of the support plate is multiple times greater than its thickness.

The rider plate comprises an in particular central mounting opening with a fastening rim, wherein the connecting hub provided as a clamping element projects through the mounting opening of the rider plate. It can be expedient when the rider plate is secured with axial clearance on the connecting hub.

In a further embodiment of the invention, the fastening rim of the mounting opening of the rider plate is arranged axially between an end of the connecting hub and the pressure plate.

An advantageous embodiment is provided when on the connecting hub a captive securing device is formed by means of which the rider plate is captively secured on the connecting hub. Expediently, the pressure plate can also be captively arranged on the connecting hub.

In a preferred embodiment of the invention, the rider plate and the pressure plate are secured together on the connecting hub. Advantageously, it is provided to configure the connecting hub, the rider plate, and the pressure plate as a conjoint, connected component assembly that can be handled as a unit.

For fixedly clamping a tool member on a support plate of a tool head, the component assembly that can be handled as a unit must only be threaded onto the output shaft and then the clamping device, preferably a clamping nut, is to be screwed onto the end of the drive shaft. Faulty installation of the individual components in wrong orientation and/or sequence as well as a loss of individual components are thus substantially prevented.

In an advantageous further embodiment of the invention, it is provided that the connecting hub comprises a thick or wide section. The thick or wide section can be formed in particular by a collar, a shoulder or a securing ring. A thick or wide section can be any element that changes the radial expansion of the connecting hub. The thick or wide section can expediently form a support surface for the clamping device. In a particular embodiment of the invention, the thick or wide section is not only provided as a support surface for the clamping device but also forms at the same time a part of a captive securing device and/or can moreover be utilized as a force transmitting surface. By means of the force transmitting surface, the applied clamping force can be further transmitted to the pressure plate. The thick or wide section is utilized to perform multiple functions. The thick or wide section can in particular be arranged at one end of the connecting hub. The thick or wide section can also be formed by a component of the device, for example, by forming the pressure plate together with the connecting hub as one piece.

The longitudinal center axis of the connecting hub is positioned coaxial with the axis of rotation of the drive shaft, wherein, relative to the support plate, the connecting hub comprises a proximal end and a distal end. The proximal end of the connecting hub comprises a spacing relative to the support plate. The spacing relative to the support plate is dimensioned such that the proximal end has a residual spacing relative to the support plate even when the tool member is fixedly clamped.

In a further embodiment of the invention, the pressure plate and the connecting hub can be arranged rotationally fixed relative to each other; in this way, it is achieved that the torque that is applied by the drive shaft by means of the connecting hub on the pressure plate is transmitted, on the one hand, by friction between the pressure plate and the tool member and, on the other hand, by friction between the support plate and the tool member.

It can be expedient to configure the pressure plate and the connecting hub together as one piece.

The connecting hub projects through the mounting opening of the rider plate with an axial section, wherein the axial section has a predetermined length. The length of the axial section is dimensioned such that it corresponds at least to the height of the fastening rim of the rider plate and maximally to the height of the fastening rim of the rider plate plus the axial height of the pressure plate. The axial height of the pressure plate can be measured in the clamped and in the unclamped state of the device.

An independent aspect of the invention is the configuration of a component assembly of a connecting hub, a rider plate, and a pressure plate for use in a device for fastening a tool member on a rotatingly driven output shaft. In this context, the component assembly is formed by the connecting hub, the rider plate, and the pressure plate. This component assembly can be handled as a conjoint, connected unit so that for mounting and demounting of a tool member only the clamping device and the component assembly must be mounted and demounted as two parts separate from each other. It can be expedient to integrate the clamping device, in particular a clamping nut, in the component assembly and/or to secure it captively on the component assembly.

The component assembly comprises a central opening, wherein for mounting the tool member it is only necessary to simply thread the component assembly by means of the opening onto the drive shaft. The connecting hub engages by rotary followers with form fit the drive shaft while the rider plate is secured so as to be rotatable on the connecting hub. Upon contact with the ground, the rider plate therefore can rotate relative to the connecting hub. In the clamped state, the rider plate can rotate freely when the possibly existing friction between the connecting hub and the fastening rim of the rider plate is overcome.

Further features of the invention result from the further claims, the description, and the drawing in which embodiments of the invention to be described in detail in the following are illustrated.

The details, features, and advantages mentioned in regard to the individual embodiments can be transferred also onto other embodiments and are not limited to the respectively mentioned embodiment in relation to which they have been described.

DESCRIPTION OF PREFERRED EMBODIMENTS

Figure 1:
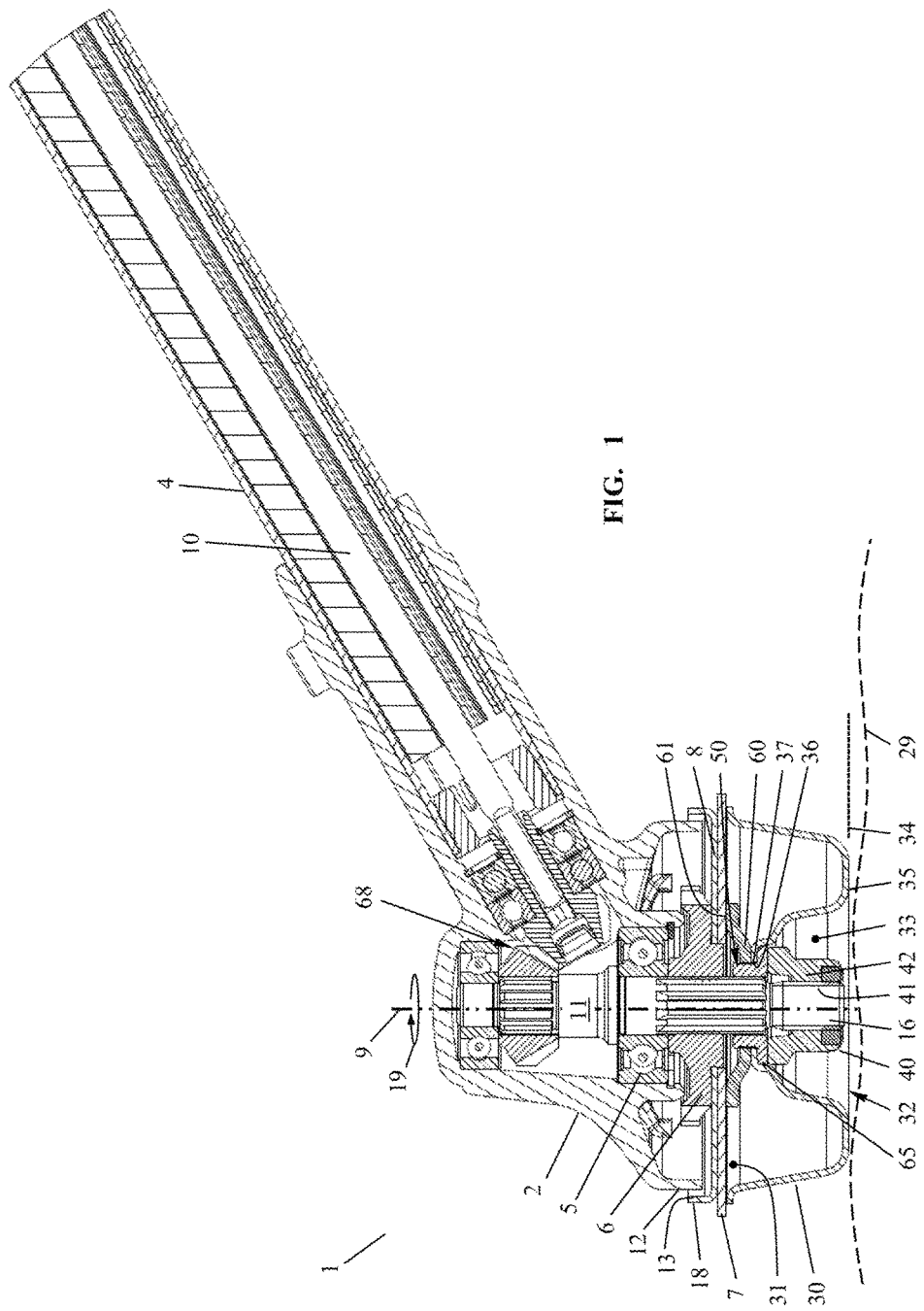
FIG. 1 is a section view of a tool head embodied as a gearbox head arranged on an end of a drive shaft.
Figure 2:
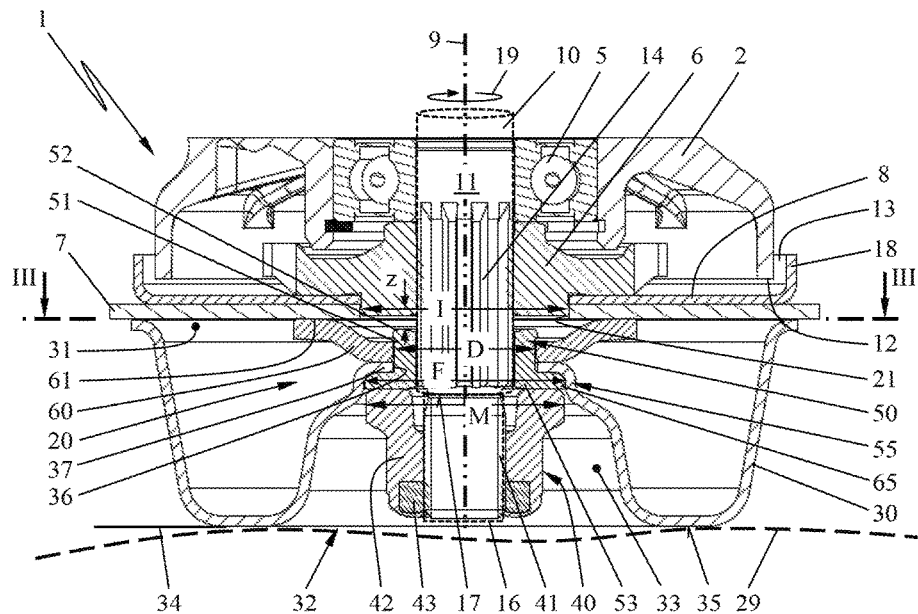
FIG. 2 is an enlarged detail illustration of a section view of the tool head according to FIG. 1 with a device for fastening a tool member on the output shaft of the tool head.
Figure 3:
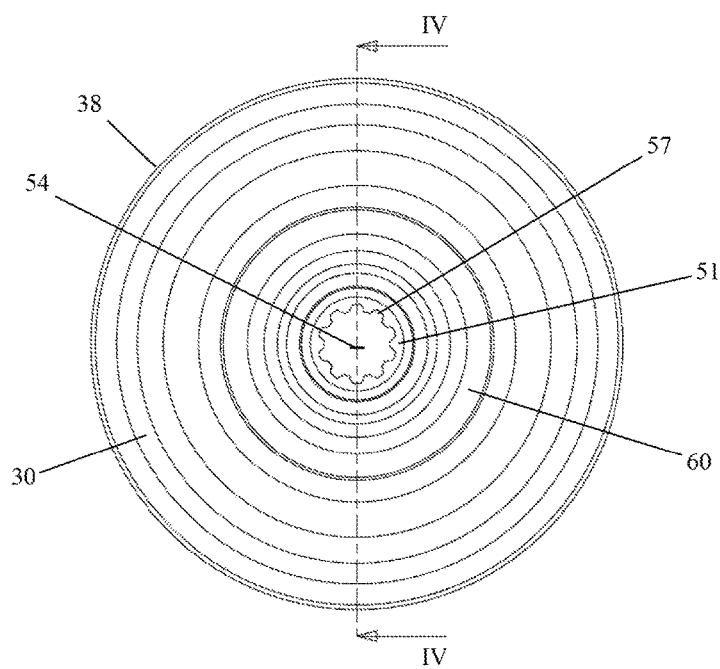
FIG. 3 is a plan view of the fastening device in the direction of arrows III-III of FIG. 2.

The tool head 1 illustrated in section view in FIGS. 1 and 2 is comprised of a base body 2 which is secured in particular at one end 3 of a protective tube 4 of a drive unit, not illustrated in detail. The power tool which is illustrated partially in FIG. 1 can be a brush cutter, a pole pruner or a similar power tool. In the protective tube 4, a rotatably driven drive shaft 10 is accommodated which is advantageously driving by means of a gearbox 68 an output shaft 11 in the tool head 1.

In another embodiment, it can be expedient to arrange a tool member 7 immediately on the end of the drive shaft 10. The terms drive shaft 10 and output shaft 11 in the context of the invention are used exchangeably.

In the illustrated embodiment, the output shaft 11 in the base body 2 of the tool head 1 that is driven by the drive shaft 10 is rotatably supported by bearings 5, wherein the bearings 5 advantageously can be designed as roller bearings. The output shaft 11 can also be formed by the end of the drive shaft 10. In the illustrated embodiment, the output shaft 11 is the output shaft of the gearbox 68 whose input shaft is formed by the drive shaft 10.

A support plate 6 for the tool member 7 is pushed onto the output shaft 11. The shape and the dimensions of the support plate 6 can be selected so as to be expedient; in particular, the radial expansion of the support plate 6 is greater, in particular multiple times greater than its expansion in axial direction. The support plate 6 in the illustrated embodiment is round and the diameter of the support plate 6 is multiple times greater than its thickness. The support plate 6 supports a cover plate 8 which closes off the base body 2 of the tool head 1 at the tool member side. The cover plate 8 is rotatable relative to the stationary base body 2 about the axis of rotation 9 of the output shaft 11. Expediently, a crimped rim 18 of the cover plate 8 overlaps the outer rim 12 of the base body 2. A rotation slot 13 is formed between the rim 12 of the base body 2 and the rim 18 of the cover plate 8.

In the illustrated embodiment, the support plate 6 is connected so as to be rotationally fixed on the output shaft 11 in drive direction 19. For this purpose, the output shaft 11 has longitudinal ribs 14 that engage corresponding keyway grooves 15 (FIGS. 15, 16) of the support plate 6. The support plate 6 is thus rotationally fixed on the output shaft 11. The support plate 6 is connected with form fit with the output shaft 11 in circumferential direction of the output shaft 11.

Figure 4:
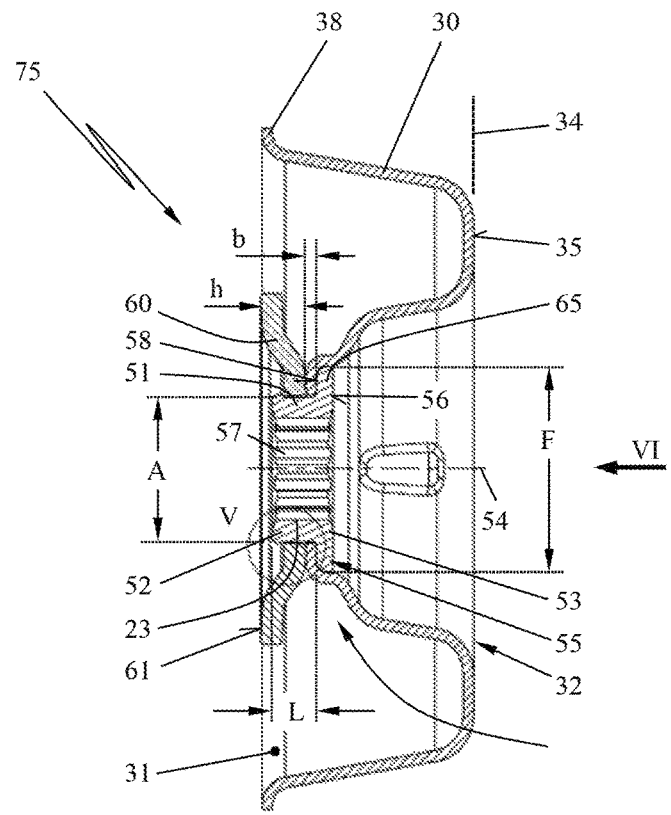
FIG. 4 is a section view along the section line IV-IV of FIG. 3 of the device for fastening a tool member.

The tool head 1 supports a rider plate 30 which, as shown in the section illustrations of FIGS. 1, 2, and 4, is designed as an open pot, in particular an annular pot. The rider plate 30 comprises a pot opening 31 which is facing the support plate 6 and/or the tool member 7.

The bottom 32 of the rider plate 30 comprises a recess or depression 33 which is stamped in the direction toward the pot opening 31; the free end 16 of the output shaft 11 ends in the recess or depression 33. The recess or depression 33 in the bottom 32 of the rider plate 30 is designed such that the end 16 of the output shaft 11 ends before the plate plane 34 of the rider plate 30. The rider plate 30 is axially projecting in the direction toward the ground 28 past the free end 16 or the clamping device 40. The clamping device 40 which is arranged at the free end 16 is positioned within the depression 33 so that the free end 16 of the output shaft 11 as well as the clamping device 40 are protected from contacting the ground 29.

The plate plane 34 of the rider plate 30 is determined by the annular surface 35 of the bottom 32 which is formed due to the depression 33 in the bottom 32 of the rider plate 30. At the center of the depression 33, a mounting opening 36 is formed which is delimited by a circumferentially extending fastening rim 37.

The output shaft 11 which is connected in the embodiment with the drive shaft 10 comprises a shoulder 17 which is formed by the free end 16 of the output shaft 11 that is reduced with respect to its diameter. Between the shoulder 17 and the free end 16 an external thread 41 for screwing on a clamping device 40 is formed in the embodiment. In the illustrated embodiment, the clamping device 40 is a clamping nut 42 but can also be a clamping screw or the like which is screwed into an inner thread provided in the output shaft. In the illustrated embodiment, the clamping device 40 is designed as a clamping nut 42, preferably as a self-locking nut with a securing ring 43 (FIG. 2). The securing ring 43 is comprised preferably of plastic material into which the external thread 42 will cut.

The clamping nut 42 acts on a clamping element 50 which is embodied in the illustrated embodiment as a connecting hub 51. The longitudinal axis 54 (FIG. 4) of the connecting hub 51 is positioned coaxial with the axis of rotation 9 of the drive shaft 10. The connecting hub 51 comprises, relative to the support plate 6, a proximal end 52 and a distal end 53.

In the embodiment according to FIGS. 1 to 7, a thick (or wide) section 55 is integrally formed on the distal end 53 of the connecting hub 51 and, as shown in FIG. 4, is designed as a circumferentially extending collar. The thick section 55, preferably embodied as a collar, comprises a support surface 56 (FIG. 4) which is facing the clamping device 40 or the clamping nut 42 illustrated in the embodiment.

It can be advantageous to design the outer diameter F of the thick section 55 to be of the same size or greater than the maximum outer diameter M of the clamping nut 42.

The connecting hub 51 comprises inner keyway grooves 57 that interact with the longitudinal ribs 14 on the output shaft 11. The longitudinal ribs 14 engage the keyway grooves 57 and secure a form-fit, rotationally fixed connection between the connecting hub 51 and the output shaft 11 in the circumferential direction of the output shaft 11.

The fastening rim 37 of the rider plate 30 is contacting the annular surface of the thick section 55 which is opposite the support surface 56 (see FIG. 4). The diameter D (FIG. 2) of the mounting opening 36 is greater than the outer diameter A (FIG. 4) of the connecting hub 51. The diameter D (FIG. 2) of the mounting opening 36 is at the same time smaller than the maximum outer diameter of the connecting hub 51 which, in the illustrated embodiment according to FIG. 4, is formed by the outer diameter F of the thick section 55.

The clamping force for clamping the tool member 7 which is applied by the clamping device 40 on the connecting hub 51 is transmitted by a pressure plate 60 to the tool member 7. The pressure plate 60 in the embodiment is positioned with an annular surface 61 on the tool member 7; the inner diameter of the annular surface 61 is greater than the inner diameter I (FIG. 2) of the tool member opening 21. The contact of the pressure plate 60 can also be non-circular, for example, a point-shaped contact at several locations which may be arranged on a common diameter circle, can be advantageous.

The pressure plate 60, the rider plate 30, and the clamping element 50 that is embodied as a connecting hub 51 are penetrated by the output shaft 11. On the free end 16 of the output shaft 11 that is projecting from the distal end 53 of the connecting hub 51, the clamping device 40 is secured; in the embodiment, the clamping nut 42 is screwed on.

Figure 8:
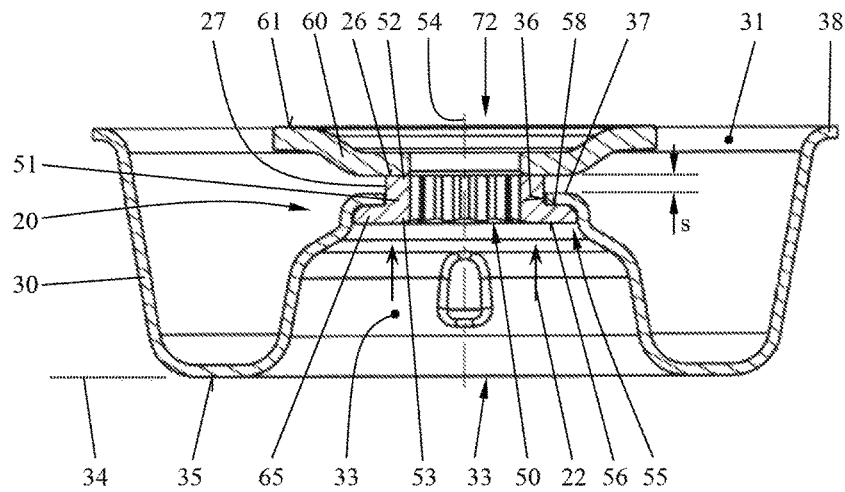
FIG. 8 is a section view of a further embodiment of the device in an illustration in accordance with FIG. 4.
Figure 12:
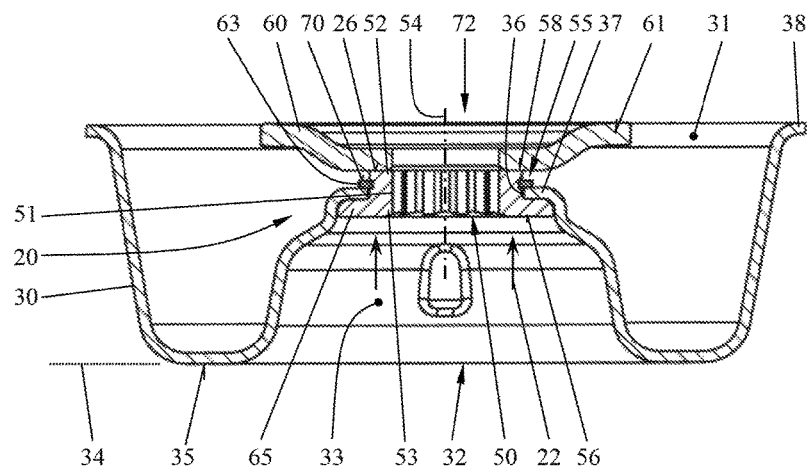
FIG. 12 is a fifth embodiment of the device in an illustration in accordance with FIG. 8.
Figure 14:
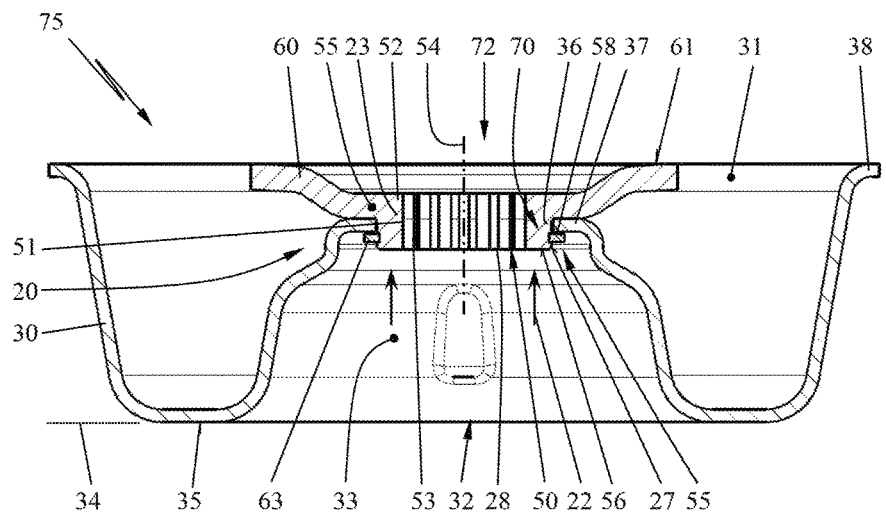
FIG. 14 is a seventh embodiment of the device in an illustration in accordance with FIG. 8.

The rider plate 30 is secured preferably rotatably on the connecting hub 51; in all illustrated embodiments, except those of FIGS. 8 and 12, the pressure plate 60 is secured on the connecting hub 51. The connecting hub 51 penetrates with its proximal end 52 the pressure plate 60 or, as shown in FIG. 14, is formed together with the pressure plate 60 as one piece. The connecting hub 51 ends at a spacing z in front of the support plate 6.

In the embodiment, the fastening rim 37 of the mounting opening 36 of the rider plate 30 is positioned between the thick section 55 and the pressure plate 60. The axial clamping force which is applied on the support surface 56 of the connecting hub 51 is introduced in the embodiment according to FIGS. 1 to 7 by means of a thick section 55 embodied as a collar 65, whose annular surface acts as force transmitting surface 58, and of the fastening rim 37 immediately into the pressure plate 60 which transmits the clamping force by means of its annular surface 61 to the tool member 7 (see FIG. 4). The tool member 7 is secured at least by friction between the support plate 6 or the cover plate 8 and the pressure plate 60 so that upon rotation of the output shaft 11 in the drive direction 19 the tool member 7 is entrained in rotation.

When upon rotation of the tool member 7 about the axis of rotation 9 of the drive shaft 11 contact between the rider plate 30 and the ground 29 occurs, the rider plate 30 can rotate relative to the connecting hub 51 which is secured with form fit on the output shaft 11. This relative rotation of the rider plate 30 relative to the connecting hub 51 has no effect on the clamping device 40 or the clamping nut 42. Release of the clamping device 40 or of the clamping nut 42 is reliably prevented.

Figure 5:
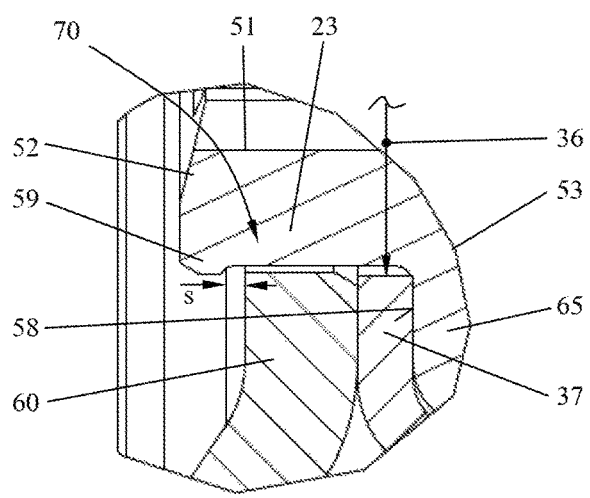
FIG. 5 is a detail illustration of detail V of FIG. 4.

As is shown in particular in the enlarged detail V in the illustration according to FIG. 5, the rider plate 30 and the pressure plate 60 are secured together on the connecting hub 51. A captive securing device 70 ensures that the rider plate 30 is captively secured on the connecting hub 51. The captive securing device 70 also ensures that the pressure plate 60 is arranged captively on the connecting hub 51.

As is shown also in FIG. 5, the captive securing device 70 is formed on the distal end 53 of the connecting hub 51 by the thick section 55, preferably embodied as a collar 65, and the captive securing device 70 is formed at the proximal end 52 of the connecting hub 51 by a further thick section 59 of the connecting hub 51 having a reduced radial expansion compared to the thick section 55. The thick section 59 can be designed as a partially extending or circumferentially extending collar that is formed prior to or during mounting on the connecting hub 51. The central opening of the pressure plate 60 has advantageously a somewhat smaller diameter than the connecting hub 51 at the thick section 59. Upon mounting, the pressure plate 60 can be pressed elastically past the existing thick section 59 of the connecting hub 51. In this way, the rider plate 30 which has already been threaded across the thick section 59, can be secured—despite its greater mounting diameter—indirectly by the pressure plate 60 by means of the thick section 59.

FIG. 5 shows also that the rider plate 30 and/or the pressure plate 60 can be secured with axial clearance s on the connecting hub 51.

Figure 7:
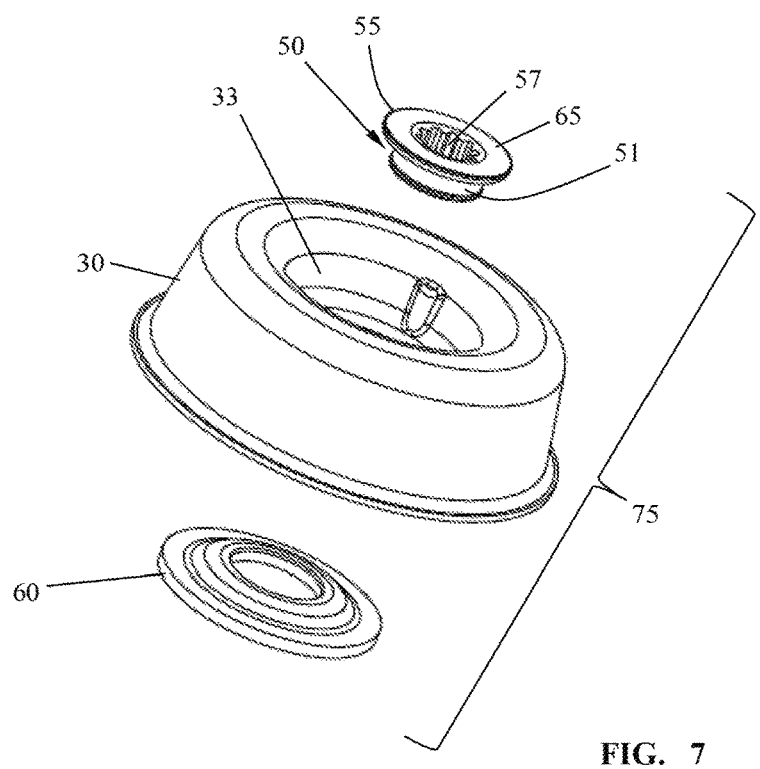
FIG. 7 is a schematic exploded illustration of the components forming a component assembly of a device for fastening a tool member.

In a particular embodiment of the invention, the connecting hub 51, the rider plate 30, and the pressure plate 60 together form a conjoint, connected component assembly 75. The exploded view of FIG. 7 shows the individual elements of this component assembly 75.

Figure 6:
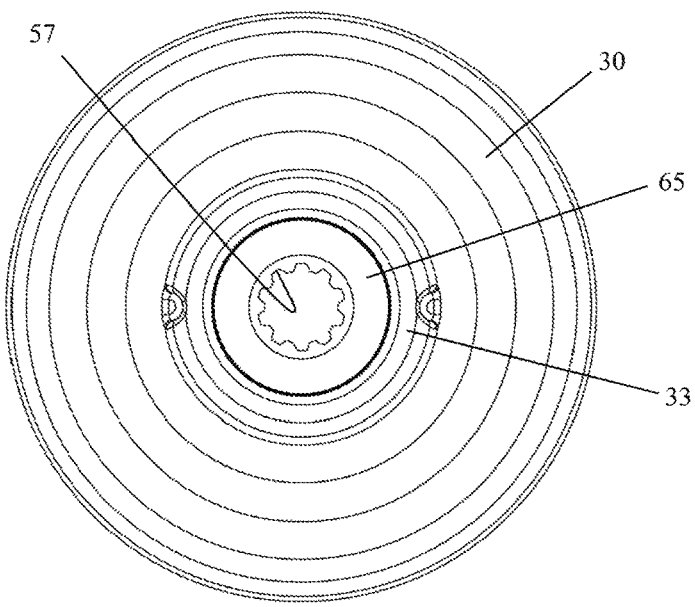
FIG. 6 is a view of the device in the direction of arrow VI of FIG. 4.

FIG. 6 shows a plan view of the component assembly 75 with the support surface (collar 65) for the clamping device 40 and the inner keyway grooves 57 for rotationally fixed connection of the connecting hub 51 with the output shaft 11.

As illustrated in particular in FIG. 4, the connecting hub 51 penetrates the mounting opening 36 of the rider plate 30 and the pressure plate 60 wherein an axial section 23 of the connecting hub 51 has a length L that amounts to at least the height b of the fastening rim 37 of the rider plate 30 and maximally the height b of the fastening rim 37 plus the axial height h of the pressure plate 60.

The dimensions refer to the unclamped state of the component assembly 75. For the clamped state of the component assembly 75, the maximum length L of the axial section 23 is described by the height of the fastening rim 37 and the minimum height h of the pressure plate 60 in the clamped state.

In a particular embodiment of the invention, the device for fastening the tool member 7 is formed as a component assembly 75 comprised of the connecting hub 51, the rider plate 30, and the pressure plate 60, wherein the component assembly 75 serves for use in the described device 20 for fastening the tool member 7 on an output shaft 11, driven by a drive shaft 10, of a motorically driven power tool. The connecting hub 51, the rider plate 30, and the pressure plate 60 form together a conjoint, connected component group with a central opening 72 for receiving the output shaft 11. In this context, the connecting hub 51 comprises rotary followers, preferably in the form of keyway grooves 57, for form-fit rotational engagement with the output shaft 11 while the rider plate 30 with its mounting opening 36 is rotatably secured on the connecting hub 51.

The embodiments described in the following correspond in their basic configuration to the embodiment according to FIGS. 1 through 7 so that same parts are identified with same reference characters. The rider plate 30 in all embodiments is arranged between a thick section 55, 59 of the connecting hub 51 and the pressure plate 60. The thick section 55, 59 can be formed partially or continuously in circumferential direction. A thick section 55, 59 can be provided, for example, by means of a collar 65 formed on the connecting hub 51, by arranging a securing ring such as a spring ring, by forming a shoulder or a step, or by providing similar elements.

The constructive details, advantages, and particular features mentioned in connection with the embodiment of FIGS. 1 through 7 can also be realized in the further embodiments. The same holds true also for the constructive configurations, advantages, and features that are mentioned in connection with the further embodiments and, without limitation, can also be utilized in the embodiment according to FIGS. 1 to 7 or the other embodiments. The constructive features which are illustrated in the different embodiments can be combined in any form with each other.

For example, the embodiment according to FIG. 8 shows a component assembly 75 in which the pressure plate 60 adjoins the proximal end 52 of the connecting hub 51. The connecting hub 51 acts at the proximal end 52 by means of an axial end face 26 on the pressure plate 60. It can be expedient to connect the pressure plate 60 with the connecting hub 51 in order to form in this way a conjoint, connected component assembly 75 in which the elements are joined captively to each other.

The pressure plate 60 can be threaded with or without form fit onto the output shaft 11. After positioning the connecting hub 51 on the output shaft 11, the clamping force, applied in the direction of arrow 22 on the thick section 55, is transmitted by means of the proximal end 52 and its end face 26 to the pressure plate 60. In the illustrated embodiment according to FIG. 8, the rider plate 30 is resting on the circumference 27 of the connecting hub 51 and has an axial spacing s relative to the pressure plate 60. The spacing s constitutes in the demounted state of the device an axial clearance of the same size. Upon mounting the device 20 on the output shaft 11, the spacing s remains constant in this embodiment. In the final mounted state, i.e., after application of the clamping force causing frictional fixation of the tool member 7 on the support plate 6, the axial spacing s remains. The rider plate 30 is supported with its circumferential rim 38 delimiting the pot opening 31 on the tool member 7 and with the fastening rim 37 of the mounting opening 36 on the thick section 55. In the final mounted position on the tool head 1, the rider plate 30 comprises advantageously no clearance, despite the axial spacing s; it is in particular clamped without clearance on the tool head 1. The rider plate 30 can rotate relative to the connecting hub 51 on its outer circumference 27. Depending on how strong the rider plate 30 is clamped axially on the tool head 1, a minimal torque may be required for overcoming the friction. A rotational movement of the rider plate 30 relative to the connecting hub 51 or to the output shaft 11 can occur, for example, when the annular surface 35 of the rider plate 30 comes into contact with the ground 29 (FIGS. 1 and 2).

Figure 9:
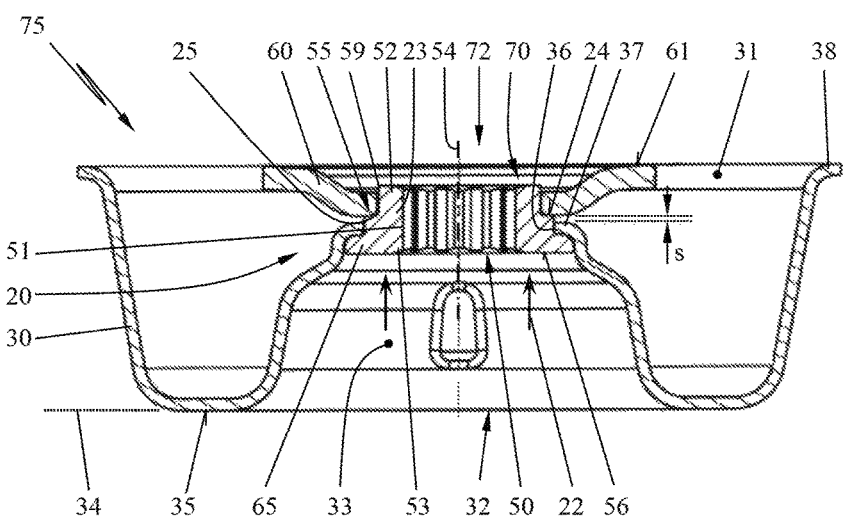
FIG. 9 is a section view of a third embodiment of the device in an illustration in accordance with FIG. 8.

In the embodiment according to FIG. 9, the connecting hub 51 projects through the pressure plate 60 and the pressure plate 60 is contacting an annular shoulder 25 of the axial section 23 of the connecting hub 51. The clamping force is applied according to the direction of arrow 22 in FIG. 9 at the distal end 53 of the connecting hub 51 and is transmitted by the annular surface 24 of the annular shoulder 25 to the pressure plate 60. The captive securing device 70 is not mandatorily provided.

The rider plate 30 is secured by means of its fastening rim 37 at an axial spacing s to the pressure plate 60 on the connecting hub 51. A thick section 59 according to the first embodiment (see FIG. 4) can be provided on the proximal end 52 of the connecting hub 51 so that the captive securing device 70 for the pressure plate 60 is formed by the annular shoulder 25 and the thick section 59 on the proximal end 52 of the connecting hub 51. The captive securing device 70 for the rider plate 30 is formed by the thick section 55 and the pressure plate 60 that is preferably secured on the connecting hub 51. The fastening rim 37 of the mounting opening 36 of the rider plate 30 has axial clearance s between the pressure plate 60 and the thick section 55.

In the embodiment according to FIG. 9, the connecting hub 51, the rider plate 30, and the pressure plate 60 form together a conjoint component assembly 75 which is threaded by means of its central opening 72 onto the output shaft 11 and is fixed by means of a clamping device 40, preferably a clamping nut 42.

Figure 10:
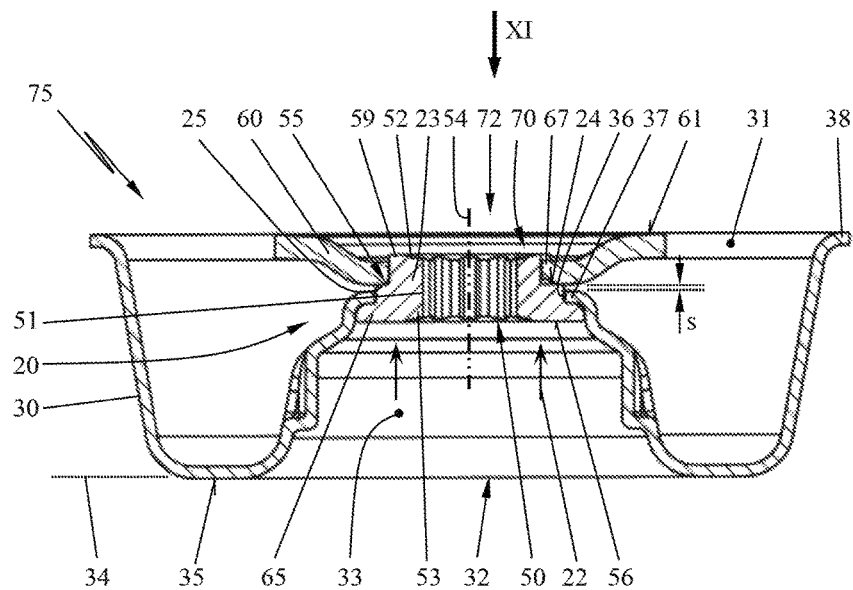
FIG. 10 is a section view of a fourth embodiment of the device according to an illustration in accordance with FIG. 8.
Figure 11:
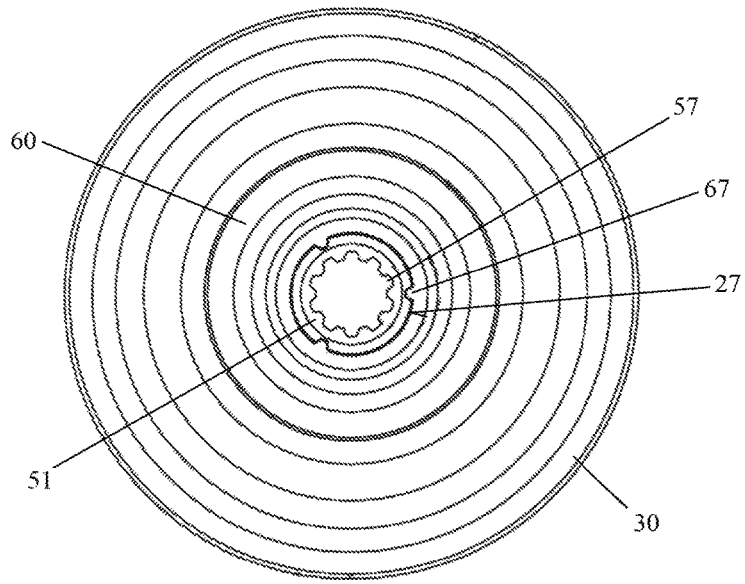
FIG. 11 is a plan view of the device of FIG. 10 in the direction of arrow XI of FIG. 10.

In the embodiment according to FIGS. 10 and 11, the pressure plate 60 engages by rotary followers 67 the outer circumference 27 (FIG. 11) of the connecting hub 51 so that the pressure plate 60 is secured rotationally fixed on the connecting hub 51. When the pressure plate 60 is secured on the connecting hub 51 against rotation, the slip moment of the tool member 7 can be increased because torque transmission by friction is provided to both flat faces of the tool member 7.

The embodiment according to FIG. 12 corresponds in the basic construction to that of FIG. 8. In contrast to the second embodiment of FIG. 8, the rider plate 30 is captively secured on the connecting hub 51. The captive securing device 70 in the direction toward the proximal end 52 is realized by a spring ring 63. Depending on the axial position of the spring ring 63, the axial clearance s of the rider plate 30, described in the previously disclosed embodiment, may be reduced by the spring ring 63. In an arrangement in which the rider plate 30 is not contacting the tool member 7 in the final mounted state, a defined position of the rider plate 30 is still ensured in this way. The spring ring 63 secures the fastening rim 37 of the mounting opening 36 of the rider plate 30 substantially without clearance, in particular free of clearance, but so as to be rotatable between the thick section 55 of the connecting hub 51 and the spring ring 63. The pressure plate 60 is provided on the end face 26 of the proximal end 52 of the connecting hub 51. Expediently, the end face 26 of the connecting hub 51 is detachably resting on the pressure plate 60.

Figure 13:
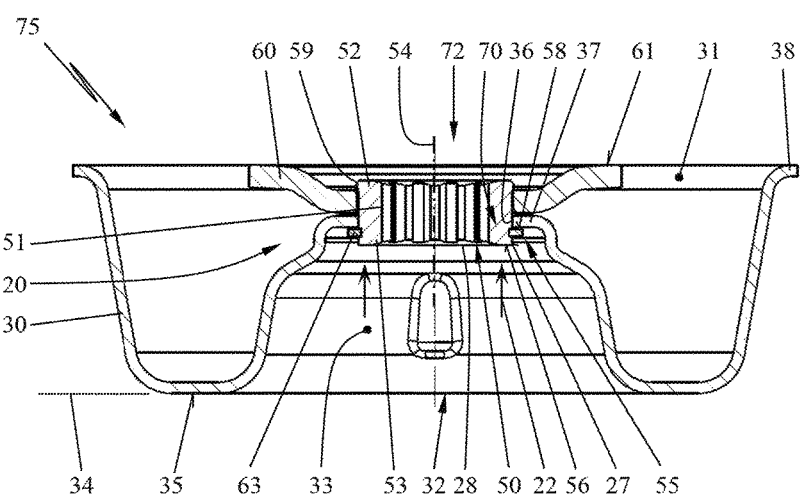
FIG. 13 is a sixth embodiment of the device in an illustration in accordance with FIG. 8.

In the embodiment according to FIG. 13, the connecting hub 51 is designed as a purely cylindrical base body. The end face 28 of the distal end 53 serves as a support surface for a clamping device 40, in particular a clamping nut 42. The clamping force is transmitted by means of the spring ring 63 and the fastening rim 37 to the pressure plate 60.

The embodiment according to FIG. 13 corresponds in its basic configuration to that of the first embodiment (see FIG. 4). Instead of a thick section 55 integrally formed in the shape of a collar on the base body of the connecting hub 51, the thick section 55 can also be provided by a separate element, for example, a spring ring 63, for axial securing of the rider plate 30. By means of the separate element, at the same time the pressure plate 60 arranged on the connecting hub 51 can be secured so that the clamping force is transmitted by the separate element, i.e., the spring ring 63, and the fastening rim 37 of the rider plate 30 to the pressure plate 60. The clamping device 40 in this embodiment according to FIG. 13 is contacting axially exclusively the base body of the connecting hub 51. The maximum diameter of the clamping device 40 can be greater than the diameter of the base body at the contact location. The clamping device 40 projects in radial direction past the outer circumference of the connecting hub 51.

It can be advantageous to support the pressure plate 60 in axial direction separate from the rider plate 30. As shown, for example, in FIG. 9, an annular shoulder 25 can be formed on the connecting hub 51. In this way, the load path from the clamping device 40 to the pressure plate 60 bypasses the rider plate 30. The securing device for the rider plate 30 is free of clamping forces and can be dimensioned to be weaker. Moreover, upon fixation of the device 20 on the output shaft 11, the rider plate 30 is not axially clamped or less strongly axially clamped in comparison to an intermediate support of the pressure plate 60 on the rider plate 30.

The rider plate 30 is rotatable relative to the connecting hub 51 when the device 20 is mounted on the output shaft 11 as well as when demounted. The rider plate 30 can be freely rotatable or can be rotatable only once a slipping moment has been reached. The slipping moment required for rotation of the rider plate 30 is smaller than the slipping moment required for slipping of the tool member 7 relative to the support plate 6.

In the embodiment according to FIG. 14, the pressure plate 60 is formed together with the connecting hub 51 as one piece and forms thus a thick section 55 in the meaning of a captive securing device 70. The connecting hub 51 projects through the mounting opening 36 of the rider plate 30. The rider plate 30 is secured by a thick section 55 provided on the base body of the connecting hub 51, for example, by a fastened element, here a spring ring 63, on the outer circumference 27 of the connecting hub 51. The clamping force which is applied in the direction of arrow 22, due to the direct contact and in particular due to the one-piece configuration of the connecting hub 51 and of the pressure plate 60, is introduced immediately into the pressure plate 60. The spring ring 63 is free of clamping forces.

Figure 15:
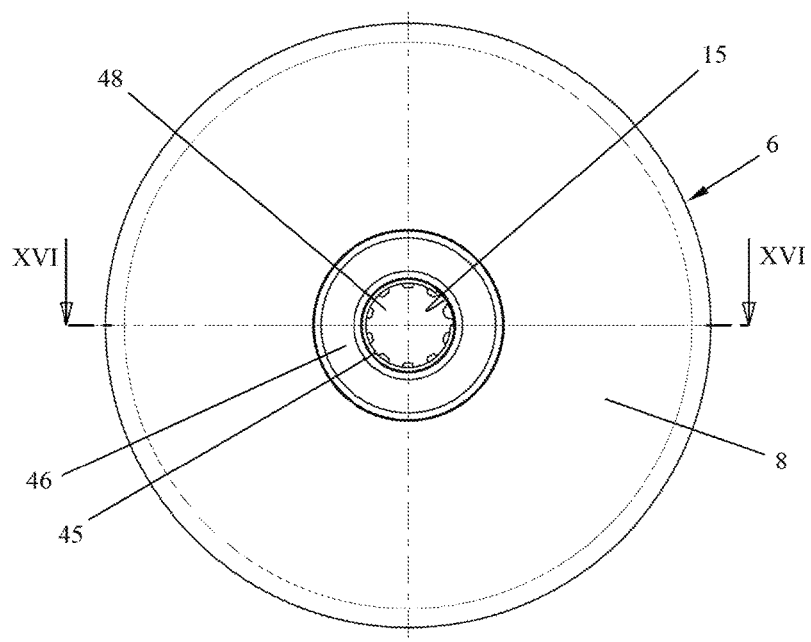
FIG. 15 is a plan view of a support plate for a tool member.
Figure 16:
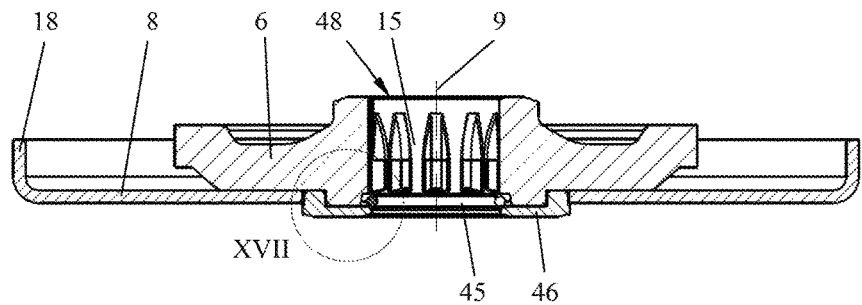
FIG. 16 is a section view along the section line XVI-XVI of FIG. 15.
Figure 17:
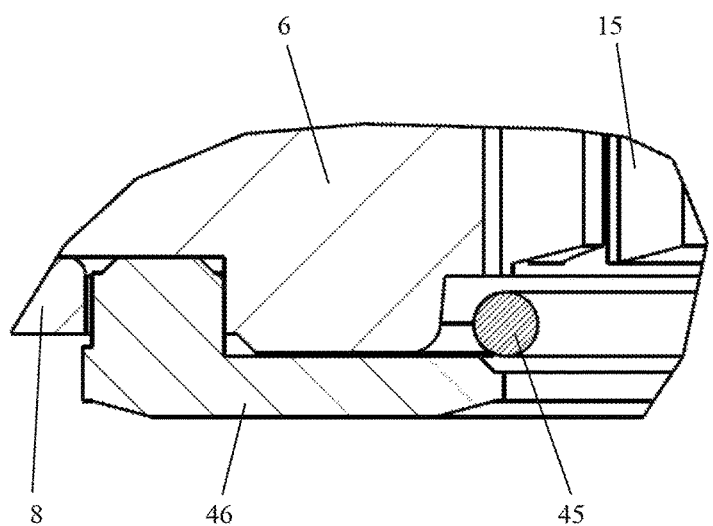
FIG. 17 shows in an enlarged illustration the detail XVII of FIG. 16.

In the embodiment of FIGS. 15 to 17, the support plate 6 which is secured on the tool head 1 is illustrated with cover plate 8. The central opening 48 of the support plate 6 penetrated by the drive shaft 10 is provided with keyway grooves 15 which are engaged by corresponding longitudinal ribs 14 of the output shaft 11 in order to produce a rotationally fixed connection between the support plate 6 and the output shaft 11. In order to ensure that the support plate 6 remains on the drive shaft 10 when demounting the tool member 7, it is provided that at one end of the support plate 6 a spring ring 45 is arranged which is illustrated enlarged in FIG. 17. The spring ring 45 is secured by means of a securing plate 46 on the support plate 6 and interacts with the output shaft 11. The spring ring 45 secures the mounted position of the support plate 6 on the output shaft 11 so that the support plate 6 is secured on the output shaft 11 even when the device 20 for fastening the tool member 7 is removed.

The specification incorporates by reference the entire disclosure of European priority document 16 001 730.7 having a filing date of Aug. 4, 2016.

While specific embodiments of the invention have been shown and described in detail to illustrate the inventive principles, it will be understood that the invention may be embodied otherwise without departing from such principles.

What is claimed is:

1. A device for fastening a tool member on an output shaft of a motorically driven power tool, the device comprising:
   a support plate configured to support the tool member;
   a clamping element embodied as a connecting hub, wherein the connecting hub is penetrated by the output shaft and is rotationally fixed on the output shaft;
   a rider plate secured on the connecting hub and rotatable relative to the connecting hub, wherein the support plate, the tool member, the rider plate, and the connecting hub are arranged such that the output shaft projects through the support plate, the tool member, the rider plate, and the connecting hub;
   a clamping device carried on an end of the output shaft, wherein the clamping device acts on a support surface of the connecting hub and fixes through the connecting hub the tool member on the support plate;
   wherein the rider plate is arranged on a circumference of the connecting hub.

2. The device according to claim 1, further comprising a pressure plate configured to contact the tool member, wherein the pressure plate is penetrated by the output shaft, and wherein the connecting hub acts on the pressure plate.

3. A device for fastening a tool member on an output shaft of a motorically driven power tool, the device comprising:
   a support plate configured to support the tool member;
   a clamping element embodied as a connecting hub, wherein the connecting hub is penetrated by the output shaft and is rotationally fixed on the output shaft;
   a rider plate secured on the connecting hub and rotatable relative to the connecting hub, wherein the support plate, the tool member, the rider plate, and the connecting hub are arranged such that the output shaft projects through the support plate, the tool member, the rider plate, and the connecting hub;
   a clamping device carried on an end of the output shaft, wherein the clamping device acts on a support surface of the connecting hub and fixes through the connecting hub the tool member on the support plate;
   a pressure plate configured to contact the tool member, wherein the pressure plate is penetrated by the output shaft, and wherein the connecting hub acts on the pressure plate;
   wherein the pressure plate is arranged captively on the connecting hub.

4. A device for fastening a tool member on an output shaft of a motorically driven power tool, the device comprising:
   a support plate configured to support the tool member;
   a clamping element embodied as a connecting hub, wherein the connecting hub is penetrated by the output shaft and is rotationally fixed on the output shaft;
   a rider plate secured on the connecting hub and rotatable relative to the connecting hub, wherein the support plate, the tool member, the rider plate, and the connecting hub are arranged such that the output shaft projects through the support plate, the tool member, the rider plate, and the connecting hub;
   a clamping device carried on an end of the output shaft, wherein the clamping device acts on a support surface of the connecting hub and fixes through the connecting hub the tool member on the support plate;
   a pressure plate configured to contact the tool member, wherein the pressure plate is penetrated by the output shaft, and wherein the connecting hub acts on the pressure plate;
   wherein the rider plate and the pressure plate are secured together on the connecting hub.

5. The device according to claim 2, wherein the connecting hub, the rider plate, and the pressure plate form together a conjoint, connected component assembly.

6. The device according to claim 2, wherein the connecting hub comprises a thick section and the thick section is a part of a captive securing device, wherein the thick section comprises a force transmitting surface acting on the pressure plate.

7. The device according to claim 2, wherein the pressure plate and the connecting hub are arranged so as to be rotationally fixed relative to each other.

8. The device according to claim 2, wherein the pressure plate and the connecting hub are formed together as one piece.

9. The device according to claim 2, wherein the rider plate comprises a mounting opening with a fastening rim, wherein the fastening rim has an axial height, wherein the connecting hub comprises an axial section that projects through the mounting opening of the rider plate, wherein the axial section has a length that amounts to at least the axial height of the fastening rim and amounts maximally to the axial height of the fastening rim plus an axial height of the pressure plate.

10. A device for fastening a tool member on an output shaft of a motorically driven power tool, the device comprising:
    a support plate configured to support the tool member;
    a clamping element embodied as a connecting hub, wherein the connecting hub is penetrated by the output shaft and is rotationally fixed on the output shaft;
    a rider plate secured on the connecting hub and rotatable relative to the connecting hub, wherein the support plate, the tool member, the rider plate, and the connecting hub are arranged such that the output shaft projects through the support plate, the tool member, the rider plate, and the connecting hub;
    a clamping device carried on an end of the output shaft, wherein the clamping device acts on a support surface of the connecting hub and fixes through the connecting hub the tool member on the support plate;
    wherein the rider plate comprises a mounting opening with a fastening rim, wherein the connecting hub projects through the mounting opening of the rider plate.

11. The device according to claim 10, wherein the rider plate is secured with axial clearance on the connecting hub.

12. The device according to claim 10, wherein the fastening rim of the mounting opening of the rider plate is arranged axially between an end of the connecting hub and a pressure plate acting on the tool member.

13. A device for fastening a tool member on an output shaft of a motorically driven power tool, the device comprising:
    a support plate configured to support the tool member;
    a clamping element embodied as a connecting hub, wherein the connecting hub is penetrated by the output shaft and is rotationally fixed on the output shaft;
    a rider plate secured on the connecting hub and rotatable relative to the connecting hub, wherein the support plate, the tool member, the rider plate, and the connecting hub are arranged such that the output shaft projects through the support plate, the tool member, the rider plate, and the connecting hub;

a clamping device carried on an end of the output shaft, wherein the clamping device acts on a support surface of the connecting hub and fixes through the connecting hub the tool member on the support plate;

a captive securing device arranged on the connecting hub and securing the rider plate captively on the connecting hub.

14. The device according to claim 1, wherein the connecting hub comprises a thick section.

15. A device for fastening a tool member on an output shaft of a motorically driven power tool, the device comprising:

a support plate configured to support the tool member;

a clamping element embodied as a connecting hub, wherein the connecting hub is penetrated by the output shaft and is rotationally fixed on the output shaft;

a rider plate secured on the connecting hub and rotatable relative to the connecting hub, wherein the support plate, the tool member, the rider plate, and the connecting hub are arranged such that the output shaft projects through the support plate, the tool member, the rider plate, and the connecting hub;

a clamping device carried on an end of the output shaft, wherein the clamping device acts on a support surface of the connecting hub and fixes through the connecting hub the tool member on the support plate;

wherein the connecting hub comprises a thick section;

wherein the support surface is formed on the thick section of the connecting hub.

16. The device according to claim 1, wherein, relative to the support plate, the connecting hub comprises a proximal end and a distal end, wherein the proximal end of the connecting hub has a spacing relative to the support plate.

17. A component assembly comprising a connecting hub, a rider plate, and a pressure plate, for use in a device for fastening a tool member on a rotatingly driven output shaft, wherein the connecting hub, the rider plate, and the pressure plate together form a conjoint, connected component assembly, wherein the conjoint, connected component assembly comprises a central opening configured to receive the output shaft, wherein the connecting hub comprises rotary followers configured to engage with form fit the output shaft for common rotation with the output shaft, and wherein the rider plate is rotatably secured on the connecting hub, wherein the rider plate is arranged on a circumference of the connecting hub.

* * * * *